Nov. 30, 1926.  
R. M. MILLER  
1,609,031  
SOUND REPRODUCING MACHINE  
Filed Oct. 25, 1922  
6 Sheets-Sheet 1  
FIG. I.
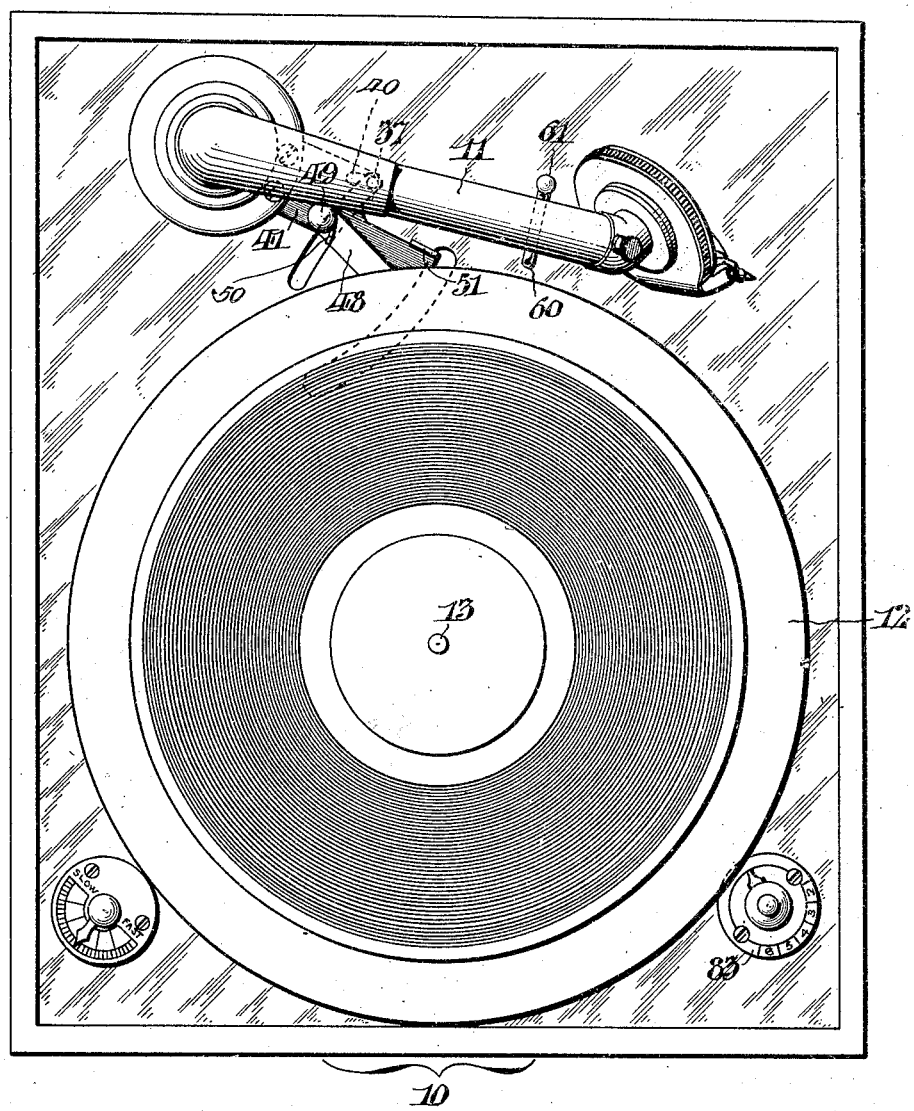
WITNESSES:
INVENTOR:  
Robert M. Miller,  
BY  
ATTORNEYS.

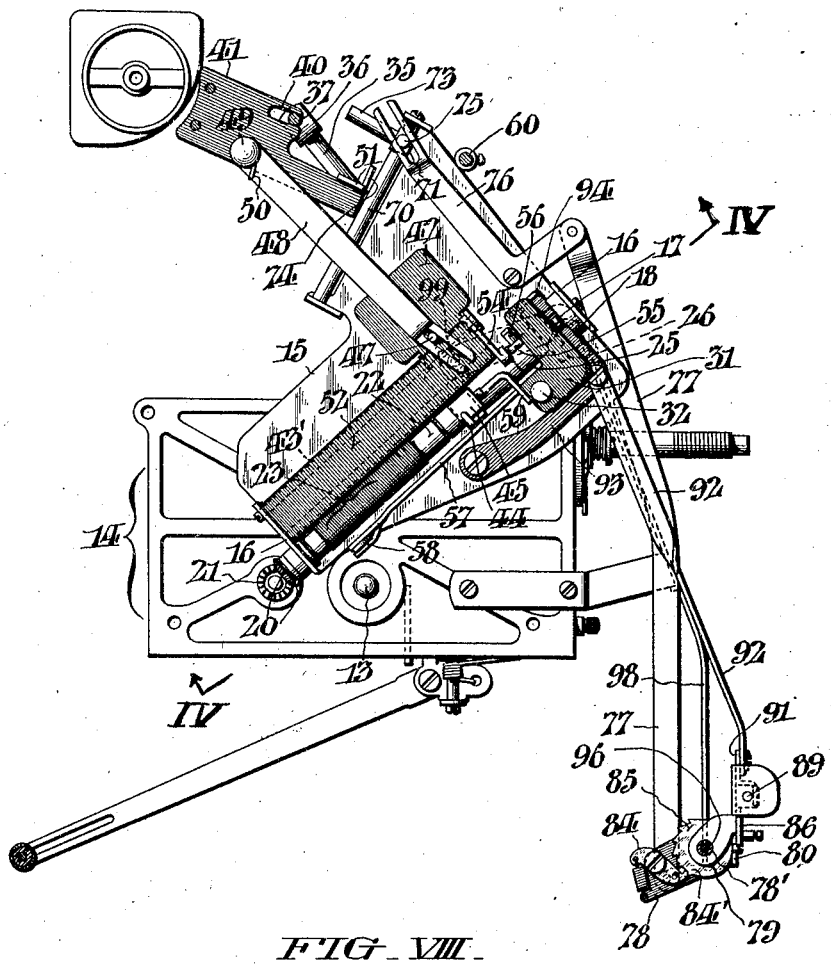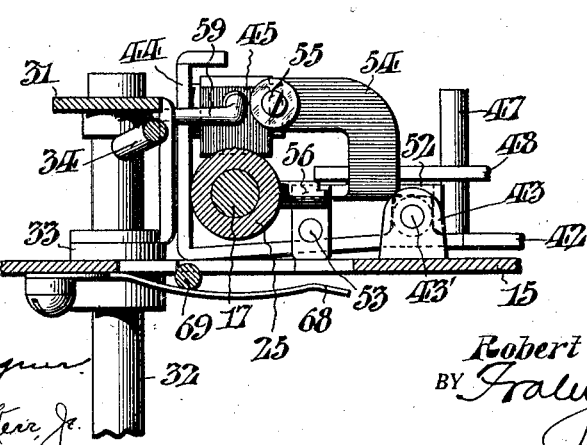

Nov. 30, 1926.
R. M. MILLER
SOUND REPRODUCING MACHINE
Filed Oct. 25, 1922
1,609,031
6 Sheets-Sheet 3
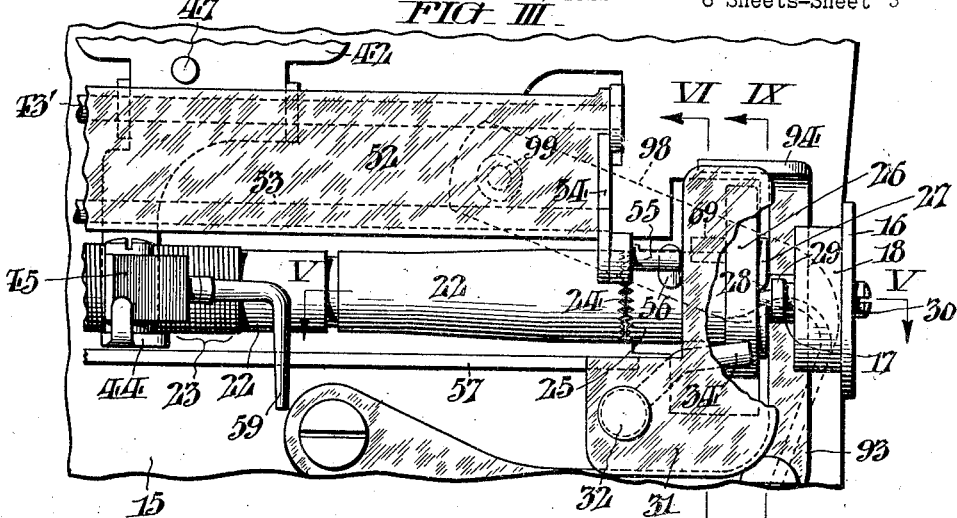
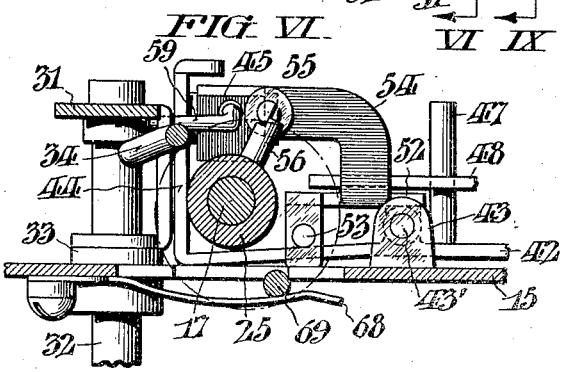
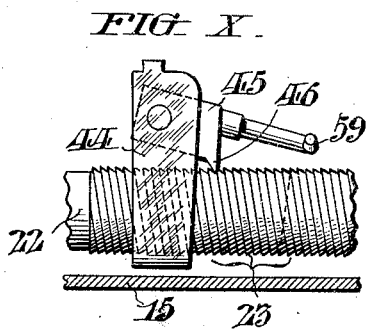
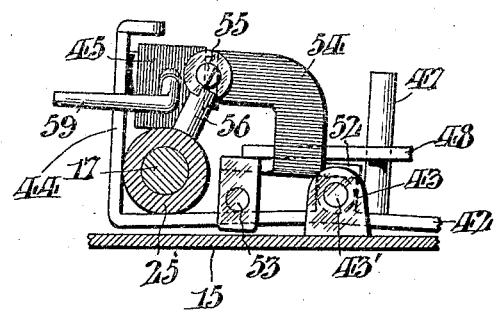
WITNESSES:
John E. Bergner
Thomas W. Kerr, Jr.
INVENTOR:
Robert M. Miller,
BY Fraley Paul
ATTORNEYS.

Nov. 30, 1926.
R. M. MILLER
SOUND REPRODUCING MACHINE
Filed Oct. 25, 1922 6 Sheets-Sheet 4
1,609,031
FIG. IV.
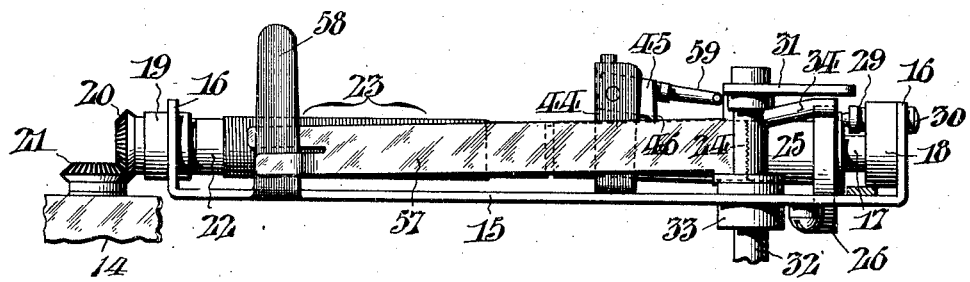
FIG. V.
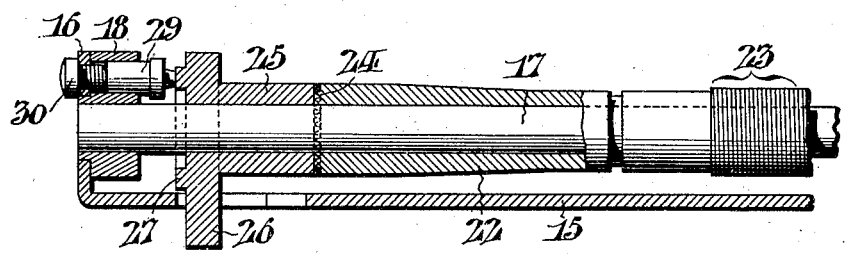
FIG. IX.
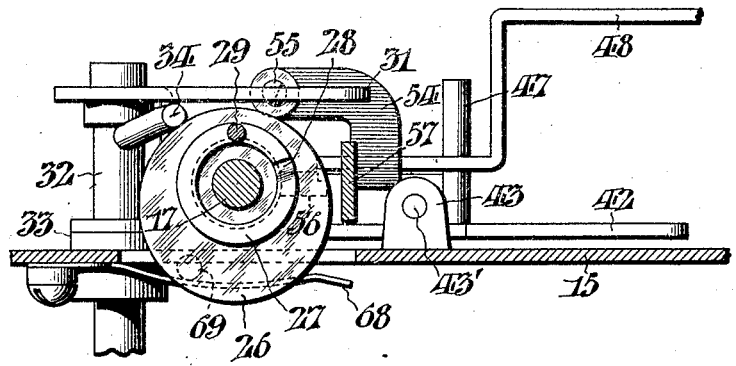
WITNESSES:
John C. Bergner
Thomas W. Kerr, Jr.
INVENTOR:
Robert M. Miller,
BY Paul
ATTORNEYS.

Nov. 30, 1926.
R. M. MILLER
1,609,031
SOUND REPRODUCING MACHINE
Filed Oct. 25, 1922        6 Sheets-Sheet 5
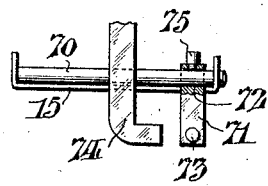
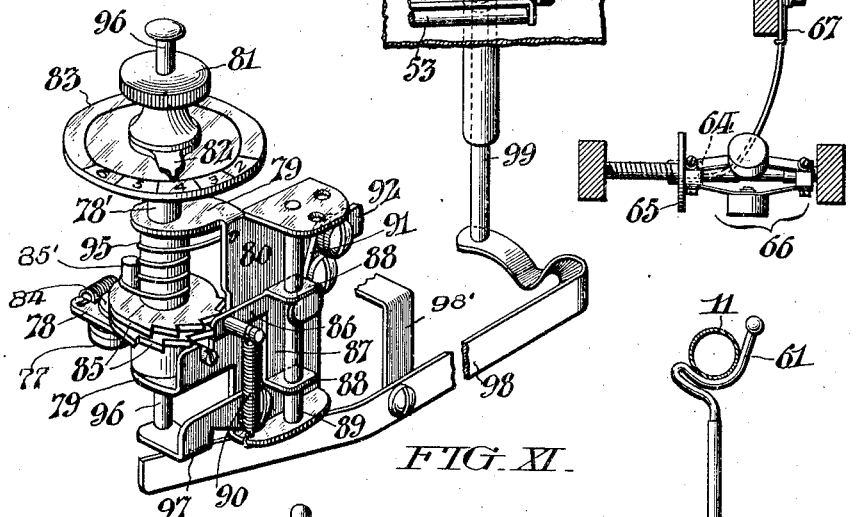
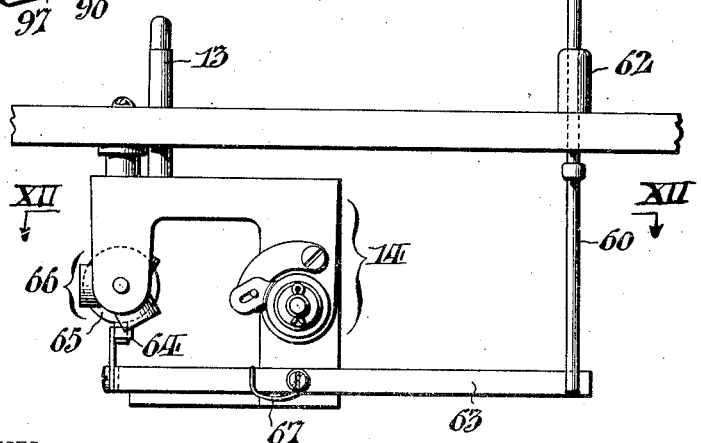
WITNESSES:
John E. Bergner
Thomas W. Kerr, Jr.
INVENTOR:
Robert M. Miller,
BY Fraley & Paul
ATTORNEYS.

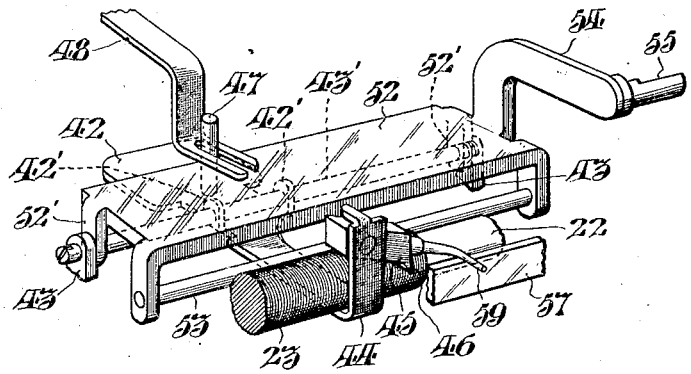
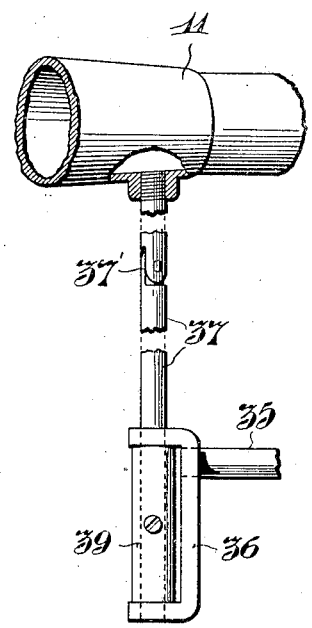
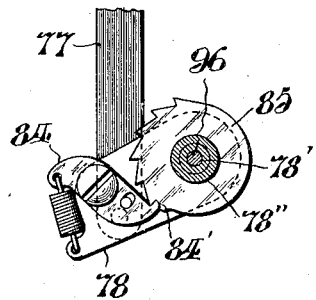

Patented Nov. 30, 1926.

1,609,031

UNITED STATES PATENT OFFICE.

ROBERT M. MILLER, OF PHILADELPHIA, PENNSYLVANIA.

SOUND-REPRODUCING MACHINE.

Application filed October 25, 1922. Serial No. 596,829.

This invention relates to sound reproducing machines and more particularly to those of the disk record type; and an object of the invention is to provide an improved non-set stopping mechanism of the character embodying a rotatable element having a convoluted groove with a co-operating follower which travels coincidentally with the tone-arm, and a mechanism actuated when the follower comes to rest as at the conclusion of a sound reproducing performance to arrest operation of the machine.

Another object of the invention is to provide a repeating mechanism co-ordinated with a stopping mechanism of the type above described in such wise as to cause repeated performances beginning at any predetermined point in the length of the record groove and to automatically stop the mechanism at the conclusion of the last repetition.

Another object of the invention is to provide a braking mechanism for sound reproducing machines, which consists of a movable support for the tone-arm and means operable by such movement of the support occurring when the weight of the tone-arm is rested thereon to co-operate with the governor mechanism in such wise as to arrest further operation of the machine.

Another object of the invention is to provide improvements in devices of the character stated for positively and accurately lifting and swinging the tone-arm and for redepositing the stylus at the selected point of repetition on the record when the mechanism is set for replaying, or to convey the tone-arm to its support when the mechanism operates to stop the machine.

The inventive concept involved in the performance of the certain objects outlined above is capable of receiving a variety of mechanical expressions, one of which for the purpose of illustrating the invention is shown in the accompanying drawings, but it is to be expressly understood that such drawings are for the purpose of illustration only and are not designed to define the limits of the invention, reference being had to the appended claims for this purpose.

In the accompanying drawings, Fig. I is a view in top plan of a sound reproducing machine illustrating the embodiment therein of my invention.

Fig. II is a view in top plan of the mechanism of my invention illustrating its relation to certain cooperating parts of the spring motor for rotating the turn-table of a sound reproducing machine.

Fig. III is a detail view in plan to an enlarged scale, of portions of the tone-arm elevating and swinging mechanism, and a tripping mechanism cooperative therewith, and showing the parts in a position assumed during playing of the record.

Fig. IV is a fragmentary illustration in side elevation of the tone arm elevating and swinging mechanism as viewed in the direction of the arrows IV—IV in Fig. II.

Fig. V is a detail view in section taken on the line V—V of Figure III.

Fig. VI is a view in section taken on the line VI—VI of Figure III, and showing the parts in a position assumed during playing of the record.

Fig. VII is a view similar to the immediate preceding figure showing certain parts in the act of being tripped at the conclusion of a second reproducing performance.

Fig. VIII is a view similar to Figure VI but showing the parts in a position assumed while the machine is inoperative.

Fig. IX is a view in section taken on the line IX—IX of Figure III.

Fig. X is a detail view of a groove follower forming part of the tripping mechanism for the automatic stop.

Fig. XI is a fragmentary view in vertical elevation of the tone-arm support and braking mechanism operable thereby.

Fig. XII is a fragmentary illustration in plan of the parts included in the braking device and the tone-arm elevating and swinging mechanism, as viewed in the direction of the arrows XII—XII in Fig. XI.

Fig. XIII is a view in perspective of the repeating mechanism and manual stop.

Fig. XIV is a detail view of a movable stop forming part of the repeating mechanism.

Fig. XV is a detail view of a portion of the tone-arm swinging means.

Fig. XVI, is a fragmentary perspective view showing certain parts of a trip plate mechanism, hereinafter fully described; and, Fig. XVII, is a detail plan view of the control means for the repeating mechanism, shown to a larger scale than in Fig. II, for the sake of clearness.

With reference to the drawings, particularly Figure I, there is indicated at 10 a cabinet designed to contain the record turning mechanism of a sound reproducing machine and to support the playing elements which include the tone-arm 11 shown as belonging to the type designed to be elevated and swung from a common point; and 12 indicates the turn-table for supporting the record and which is driven by virtue of its support upon and connection to the central spindle 13 forming part of the spring motor indicated comprehensively at 14 in Figure II.

Beginning with a description of the automatic stop mechanism, 15 indicates a horizontal plate forming a support for the parts and located directly above the spring motor 14 and within the cabinet 10. The plate 15 is formed with oppositely disposed upstanding ears 16 forming end supports for a shaft 17, the right hand end of which, as best seen in Figure IV, is journalled in a block 18, and at its opposite end in a bearing 19. A beveled gear 20 is mounted upon one end of the shaft 17 for engagement with a beveled gear 21 carried upon an arbor forming part of the motor train of gears. Fast on the shaft 17 is a sleeve 22 having one end threaded as indicated at 23 to provide a convoluted groove. The opposite end of the sleeve is formed with an end ratchet face 24 co-operating with a complementary ratchet face formed upon a sliding clutch member 25 embracing the shaft 17, said collar having an eccentric cam 26 formed therewith for a purpose to be presently described. An annular ridge 27 is formed upon the face of the cam 26 concentric with its center of rotation and said ridge is cut away to form an inclined depression 28. The block 18 is eccentrically and axially channeled to house a pin 29 the exposed end of which engages the face of the ridge 27, and is axially adjustable in extended position by means of a screw 30 threaded into the adjacent upstanding ear 16 of the supporting plate 15.

A mechanism for elevating and swinging the tone arm includes a plate 31 shown clearly in Figure IX as fixed to the upper end of a vertical rod 32 which is guided in bearings 33 for both axial and rotative movement, whereby said plate is located in a position to be engaged and elevated by the cam during rotation thereof. The rod 32 also carries a horizontal pin 34 engageable by the cam 26 so as to rotate said rod. Such movement of the rod 32 is transmitted through a horizontal arm 35 Figs. XII and XV having a U-shaped clip 36 at its opposite end affording support for a vertical rod 37 rotatably held therein, by a collar 39. The upper end of the rod 37 is appropriately connected, with interposition of a pivot point 37', to the tone-arm 11 as indicated in Fig. I. The rod 37 engages a slot 40 formed in a plate 41 Fig. I which is swingable with the tone-arm 11 and is adapted to co-operate both with a tripping and repeating mechanism now to be described.

The tripping mechanism comprises a lever plate 42 which is fulcrumed by ears 42' Fig. XVI upon a rod 43' with capacity for sliding movement, said rod being supported at its ends through the medium of ears 43 on the plate 15 aforementioned, one end of said plate 42 being extended beneath the threaded sleeve 22 and provided with an upward extension 44, Figs. VIII and XVI which carries a dog or groove follower 45, the latter being pivotally mounted for vertical oscillation and having an edge 46 Fig. X which rides in the groove of the threaded portion 23 of the sleeve 22 and is retained therein by virtue of its own weight. The lever plate 42, as stated, is slidable along its supporting rod 43', and such movement is coordinated with that of the tone-arm 11 by virtue of an upstanding pin 47 carried by said lever plate 42, which pin engages the forked end of an arm 48, said arm having its opposite end pivoted upon a vertical pin 49 around which a coiled spring 50 is embraced and arranged in such wise as to urge the arm 48 toward the right in Figure II. such movement being limited by engagement of said arm with an upstanding lug 51 formed upon the plate 41.

A plate 52 is mounted for vertical oscillation by virtue of its support through the medium of apertured ears 52' upon the rod 43' along one edge so as to permit swinging movement of the opposite edge which carries a rod 53 disposed in parallel relation to the rod 43' and resting upon the lever 42, so that said plate 52 may be raised by upward movement of the plate 42 induced in a manner to be described in any position of the latter during its course of travel. The plate 52 is provided at one end with an overhanging extension 54 carrying a laterally extending pin 55 having a notched end to engage the similarly notched end of a radial pin 56 which is carried by the before described clutch member 25 see Fig. VI. The plate 31 is formed with an extension 57 as best seen by Figs. III and IV extending in contiguous relation to the threaded sleeve 23 and guided at its opposite end for vertical movement by an upstanding projection 58 of the plate 15. The dog or groove follower 45 is provided with a laterally bent finger 59 which always overlies the top edge of the extension 57 regardless of the position of the follower along its co-operative shaft 17.

Forming part of the automatic stop mechanism is an arrangement shown in Figures XI and XII and comprising a vertical rod 60 formed at its upper end with a saddle 61 in which the tone arm 11 may be rested. The rod 60 is supported for vertical movement in a guide 62, and the lower end of said rod is conveniently bifurcated to rest upon a lever 63 suitably fulcrumed at an intermediate point and provided at its opposite end with a brake shoe 64, adapted to engage the disk 65 forming part of the governor mechanism, indicated generally at 66, of the spring motor 14. The brake shoe 64 is normally held out of engagement with the disk 65 and the rod 60, while it is retained in elevated position by means of a coil spring 67 located at the fulcrum and engaging the lever 63 in the manner shown in Fig. XI.

In the operation of this portion of the mechanism, while the same is functioning as an autotmatic stop, rotation of the turntable 12 under the influence of the spring motor 14 is initiated immediately when the tone-arm 11 is lifted from the saddle support 61. Prior to the starting of the motor 14 the parts of the mechanism assume the positions shown in Figures VIII and IX from which it will be noted that the pin 56 is retained in a horizontal position by the braking action of the tone-arm 11 while resting upon its support 60, and the clutch member 25 is retained in clutched position by virtue of the pin 29 in its engagement with the face of the ridge 27. After the tone-arm 11 has been lifted and the motor 14 released for driving, the first result of this act is to rotate the threaded sleeve 22 carrying the clutch 25 with it until the pin 29 enters the recess 28 whereupon the clutch member slips out and the clutch 25 is held against further rotation by engagement of the pin 56 with the pin 55 positioning the parts for tripping as shown in Figure VI. The stylus is now directed into the record groove and the tone-arm 11 is advanced in the usual way during the sound reproducing performance.

As an incident to initial progression of the tone-arm 11 from the position shown in Fig. I, to bring the stylus into the record groove for reproduction or playing purpose, the arm 48 will be swung concurrently therewith or to the left end as viewed in Fig. II, the motion of which in turn is communicated through the pin 47 to the lever plate 42 upon which the follower 45 is carried so that said follower will be brought into co-operative engagement with the threaded portion 23 of the sleeve 22. The pitch of the threaded portion 23 of the sleeve 22 is intended to coincide substantially with the pitch of the record groove so that no vertical or oscillatory movement of the follower edge 46 occurs other than that due to its travel along the threaded portion 23 of the sleeve 22. However, when the sound reproducing performance is concluded and the stylus comes to rest in the last groove of the record which is concentric, no further advance of the tone-arm 11 or follower 45 occurs, although the grooved element or sleeve 22 continues to rotate. As a result of this contingency, the edge 46 of the follower 45, shown more clearly in Figure X, is advanced causing the extension 44 to rise with the result that the lever plate 42 through engagement with the rod 53 causes the plate 52 to rock upwards, this movement in turn being communicated to the extension 54 so as to cause the pin 55 to disengage the pin 56, upon the release of which the clutch member 25 is slightly rotated under the influence of a spring finger 68 which engages a pin 69 extending from the cam 26. The slight rotative movement thus effected causes the clutch member 25 to be shifted toward engaging position with the clutch face 24 by virtue of the inclined depression 28 formed in the annular ridge 27 which rides along the end of the pin 29. The clutch member 25 is thus held in locking engagement with the sleeve 22 under the retaining influence of the pin 29 which continues to ride along the face of the ridge 27 during further rotative movement of said clutch member. The position of the parts at the instant of release is shown in Figure VII. As a result of such movement the first act of the cam 26 forming part of the clutch member 25, is to engage the plate 31 and elevate the tone-arm 11 through the medium of the connection described above. Immediately following such movement the pin 34 is engaged by the cam 26 and the rod 32 forming part of said connection is rotated to carry or swing the tone-arm 11 toward the initial position, such swinging movement continuing until the tone-arm 11 is brought above the saddle support 61, and clear of the record, whereupon said cam, by reason of its configuration allows the tone arm 11 to descend upon the saddle 61. The downward movement of the rod 60 occasioned when the tone arm 11 is rested on the saddle 61 causes the brake mechanism 64, 65 to function in the manner described to arrest further operation of the spring motor 14 and consequently bring the turn-table 12 to rest, bringing the parts again to the position shown in Figures VIII and IX.

It will be noted that during return movement of the tone-arm 11 in the manner stated the arm 48, under the influence of the spring 50 will retract the lever plate 42, and consequently the follower 45, to its initial position over the smooth portion of the sleeve 22 as best understood by Fig. II. It will also be noted that the upward movement of the plate 31 induced by the cam 26 in the manner described causes the extension 57 thereof to lift the bent finger 59 and thus elevate the follower 45 from engagement with the threaded portion 23 so that said follower is retracted without scraping the threads of the sleeve end 23.

While I have illustrated the present invention in conjunction with the rigid type of tone-arm 11 having a universal joint to permit swinging and elevating from the same point, I may adapt my improvements to other types of tone-arms. Hence when I refer to the tone-arm as being elevated and swung it is to be understood that I refer more particularly to the sound box or reproducing element which is the part that is to be elevated, displaced or transferred in order to control the sound reproducing performance.

The repeating mechanism comprises in its essentials a means to limit the extent of the outward or return movement of the tone-arm 11 and to position the stylus at any predetermined point upon the record without stopping the motor 14, so that the following portion of the record groove may be again traversed. Specifically, this mechanism comprises certain parts shown more clearly in Figures II, XII, XIII and XIV, and comprises a horizontal rod 70 anchored at its ends between upset ears upon the plate 15 for the support of a slide 71 having an opening 72 Fig. XIV in its upper end for guidance by said rod 70 and carrying a lateral pin 73 at its lower end for engagement by a stop in the form of a depending extension 74 of the aforementioned plate 41 which moves with the tone-arm 11. The slide 71 carries an upwardly extending pin 75 which is engaged within the forked end of a bell crank 76 pivoted upon the plate 15 and having its opposite end connected to one end of a link 77, the opposite end of which is extended toward one corner of the cabinet 10 and pivotally connected to an arm 78 forming part of the setting device, shown in Figures II, XIII, and XVII.

The setting device includes a vertical sleeve 78′ rotatably supported by vertically spaced ears 79 forming part of a bracket 80. The sleeve 78′ protrudes above the top wall of the cabinet and is equipped with an operating member in the form of a knob 81, and a pointer 82 which is selectively registrable with graduations on a dial 83. The aforesaid arm 78 is loosely mounted for independent rotation upon the sleeve 78′ through the medium of a supporting collar 78 and carries a spring pressed pawl 84, the operating end of which engages the edge of the lowermost one of a pair of ratchet disks 85 secured to said sleeve and formed with unidirectional teeth arranged in alternate circumferentially spaced relation for service as an escapement mechanism, which also includes a detent or detaining finger 86 forming part of a member 87 with lateral ears 88 engaging a vertical guide rod 89, the terminals of the latter being secured in lugs of the bracket 80 so that said detent finger may be elevated and lowered to alternately engage the disks 85 and permit progressive step by step rotation of the sleeve 78′. The detent finger 86 is retained in normally lowered engagement with the lower disk 85 by means of a spring 90 having its terminals connected respectively to the detent 86 and the lower end of the bracket 80; while said detent finger is adapted to be elevated by means of a bell crank 91 fulcrumed upon said bracket 80 and having one end engaged beneath the upper ear 88 of the member 87 and its opposite end connected by means of a link 92 to an angled arm 93 which is pivoted upon the plate 15 and is provided at its free end with an upward extension 94 adapted to be engaged by the cam 26 during the course of its revolution.

A coil spring 95 encircles the sleeve 78 with one end connected to a pin 85′ extending from the uppermost disk 85 and the other securely anchored in the bracket 80 so as to urge the toothed disks 85 in a direction counterclockwise, with respect to Figures II and XIII, said disks being limited in such movement by the engagement of one of their teeth with the pawl 84, the motion of the plate 78 carrying said pawl being in turn limited through its connection to the slide 71 by the engagement of the latter with the end support of the rod 70. The lower disk 85 is provided with a notch 84′ Figs. II and XVII which cooperates with the pawl 84 in such wise that when the sleeve 78′ Figs. XIII and XVII is rotated in a clockwise direction, incidental to setting of the repeating mechanism, the plate 78 is carried with said sleeve, transmitting its motion through the connections 77 and 76 to the slide 71, causing the latter to travel along the horizontal rod 70 until an obstruction is met (as hereinafter described) offering resistance sufficient to cause the pawl 84 to move away from the tooth or projection 84′. The sleeve 78 may, however, be further rotated until the teeth of the lower disk 85 are moved successively past the detent finger 86 to hold said sleeve in any adjusted position. It may be here noted that the parts 78, 84 and 85, are shown in the normal inoperative position in Fig. II, and as relatively adjusted by Fig. XIII. The foregoing suggested obstruction to the movement of the slide 71 is, in the present instance, the depending extension 74, which, by engagement with the pin 73 in different positions of the tone arm 11 limits the movement of said slide.

In the operation of the replaying mechanism, the tone-arm 11 is lifted to start the machine and brought to any desired selected position on the rotating record—which may be either at the beginning of the stylus groove or at some point subsequent thereto—to which position the stylus is intended to be returned after the completion of the rendition, and as soon as the stylus has been set to the selected starting position for repeat, the operating member or knob 71 Fig. XIII is turned to the right in the manner described to shift the depending slide 81 Fig. XIV until the pin 73 is engaged against the stop 74 on the arm 41 whereupon said slide remains in that position while the movement of the knob 81 is continued until the pointer 82 is brought opposite a numerical indication on the dial plate 83 corresponding to the number of times the record or selection is to be replayed. At the completion of the reproducing performance the tone-arm 11 is elevated and swung to return position by the mechanism already described. However, because of the interposition of the slide 71, the tone-arm 11 is not permitted to clear the record, i. e., to return as far as the support saddle 61, but, upon engagement of the stop 74 with the pin 73, said tone arm is held against further swinging movement because of the fact that the striking of the slide 71 at a point so far below the rod 70 causes said slide to bind against the rod 70.

The cam 26, in continued movement and after elevating and swinging the tone arm 11 in the manner stated permits the stylus to descend upon the record at the selected position of repeat, and then continues the cycle of movement until the pin 56 re-engages the pin 55 to detain the clutch member 25 and causes the parts to assume the position shown in Figure VI. During rotation of the cam 26 in the manner stated, the upward extension 94 is engaged and the arm 93 shifted, transmitting motion through the link 92 and bell crank 91 (Fig. XIII) to elevate the detent finger 86 sufficiently to release the lower disk 85 but to engage the immediately following tooth of the upper disk 85, and upon return downward movement under the influence of the spring 90 after the cam 26 is further rotated, to engage the next succeeding tooth of the lower disk 85 thus "checking off" the first rendition of the series to be played.

This operation is repeated each time the desired record selection is replayed, and until the last tooth of the lower ratchet disk 85 is permitted to escape, whereupon the arm 78 is swung around, to the maximum extent transmitting its motion through the links 77 and 76 to the slide 71, and returning the latter to its endmost position so that at the completion of the last rendition the tone-arm 11 is elevated and swung completely over to its stop position upon the support saddle 61 which automatically gravitates downwardly so as to arrest operation of the spring motor 14.

The automatic stopping mechanism is thus co-ordinated with the repeating mechanism so that at the conclusion of the last repetition, the automatic stopping mechanism is operated without the necessity of manual control of any kind to arrest motion of the turn table.

It may be desirable at times to stop the machine before the end of any selection or before the number of repetitions for which the repeating mechanism has been set are completed. For instance if the repeating pointer 82 has been set to play six times and after two repetitions it is desired to conclude the performance, a manual means is provided to restore the repeating device to initial position and stop the machine. The means whereby this is accomplished consists of a push rod 96 which is axially slidable within the sleeve 78' and engages at its lower end upon a rock lever 97 pivoted to the bracket 80, said rock lever, also, co-operatively abutting beneath the slide 86, so that when said rod 96 is lowered by depressing a button formed on its upper protruding end, the detent finger 86 is elevated to a height sufficient to clear both toothed disks 85, whereupon the latter are returned to initial position under recoil of the spring 95, while the depending slide 71, previously set, is restored to its initial position at the end of the rod 70. A lever 98 is fulcrumed in any suitable manner upon a stationary support 98' and one end is disposed beneath the rock lever 97 while the opposite end is engaged below a vertically movable rod 99 having its upper end positioned to engage beneath the oscillatable plate 52, so that when the rod 96 is depressed in the manner stated the lever 98 is rocked to elevate the rod 99 and thereby raise the plate 52, causing the pin 55 to release the pin 56 and initiate action of the tone-arm lifting and swinging mechanism, in the manner previously described, to return the tone-arm 11 to its position over the support 61 and then to lower it upon the latter to arrest operation of the spring motor 14. It will be apparent that the stop mechanism may be manually actuated at any time as during normal playing of the record, that is, while the repeating mechanism is unset by simply depressing the rod 96 which will act immediately to return the tone-arm 11 to rest position on the saddle 61.

The threaded portion 23 of the sleeve 22 may be cut so as to provide two or more threads, if desired, so that each thread is of a greater pitch than in the case of a single thread cut to conform substantially to the pitch of the record groove. A multiple thread arrangement is shown in Figure X in which the continuity of a single thread is indicated by a dotted line. As a result when the tone-arm 11 comes to rest, and consequently the follower 45, the thread by reason of its long pitch will act very quickly to raise the follower carrier 44 and thus very quickly stop the mechanism. In any event, that is, whether the thread is cut singly or in multiple, or whether the thread corresponds in pitch to the pitch of the sound-recording-groove of the record, it is to be noted that the bevel gear 21 rotates much slower than the turn table 12, and that the stylus will be progressed by the record groove at such a rate that the follower 45 may slip over the threads during its travel along the threaded portion. Hence any difference in the pitch of the sound groove in different records will have no tendency to cause undesired actuation of the follower 45, even if the sound groove of a particular record should be of minimum pitch, the rate of progression of the stylus being always greater than the rate of longitudinal advance of any point on the threaded portion 23.

Having thus described my invention, I claim:

1. The combination in a sound reproducing machine including the tone-arm and record turning mechanism, of a rotatable member having a convoluted groove, a follower operable in the groove and adapted for selective redeposit, means actuable when the follower completes its predetermined travel to elevate and return the tone-arm to initial position, and means operable by such movement of the tone-arm to return the follower to initial position.

2. The combination in a sound reproducing machine including the tone-arm and record turning mechanism, of a rotatable member, a second rotatable member adapted to be clutched with the first, means operable when the tone-arm comes to rest on the record to clutch said members, and means operable by the second member to elevate and return the tone-arm to initial position.

3. The combination in a sound reproducing machine including the tone-arm and record turning mechanism, of a rotatable member having a convoluted groove, a follower traveling coincidentally with the tone-arm and operating in the groove, a second rotatable member adapted to be clutched with the first, means operable when the follower comes to rest to clutch said members, and means operable by said rotatable member to swing the tone-arm to one side.

4. The combination in a sound reproducing machine including the tone-arm and record turning mechanism, of a rotatable cam, a rotatable member having a convoluted groove, a tripping means traveling coincidentally with the tone-arm and operable in the groove, means operable by the tripping means when the same comes to rest to clutch the cam with said rotatable member, and means operable upon rotation of the cam to elevate the tone-arm and swing the same to one side of the record.

5. The combination in a sound reproducing machine including the tone-arm and record turning mechanism, of a member driven by the record turning mechanism and having a convoluted groove, a follower traveling coincidentally with the tone-arm and operating in the groove, a cam adapted to be clutched to the member, means operable when the follower comes to rest to clutch the cam to said member, a cam engaged member to elevate the tone-arm and swing the same to one side, an extension of said cam engaged member for lifting the follower from the groove, and means operable upon movement of the tone-arm to return the follower to initial position.

6. The combination in a sound reproducing machine including the tone-arm and record turning mechanism, of a member operated by the record turning mechanism having a helical groove, a carrier movable axially of said member, a follower supported upon the carrier to operate in the groove, means operable by movement of the tone-arm and engaging the carrier to move the same coincidentally therewith, and means tripped by the follower when the carrier comes to rest to elevate the tone-arm and swing the same to one side of the record.

7. The combination in a sound reproducing mechanism including the tone-arm and record turning mechanism, of a rotatable member having a helical groove, a carrier movable axially of said member, a tripping follower supported upon the carrier and operating in the groove, a movable member located contiguously to the path of movement of the carrier so as to be engaged by the carrier in any position of the latter in its course of travel, a vertically movable means to elevate and swing the tone-arm to one side, and release means carried by the aforesaid movable member to trip said tone-arm moving means.

8. The combination in a sound reproducing machine including the tone-arm and record turning mechanism, of a rotatable member having a helical groove, a rod disposed in contiguous relation thereto, a carrier mounted to slide upon the rod, a tripping follower supported upon the carrier and operating in the groove, a plate disposed contiguously to the rotatable member and adapted to be engaged by the carrier upon rocking movement thereof at any position in its course of travel, vertically movable means adapted to elevate and swing the tone-arm to one side, and means carried by the aforesaid plate to release said tone-arm elevating means to permit actuation thereof.

9. The combination in a sound reproducing machine including the tone-arm, of a cam, a rod, a plate carried by the rod and engageable by the cam to shift the rod axially, a connection from said rod to the tone-arm to lift the latter upon such axial movement, and a pin carried by the rod engageable by the cam to rotate said rod, said connection being operable upon said rotation of the rod to swing the tone-arm.

10. The combination in a sound reproducing machine including the tone-arm and record turning mechanism, of a pair of cooperative clutch elements one of which is driven by the record turning mechanism and the other adapted for clutching movement, means operable after partial rotation of said elements in unison at the beginning of a sound reproducing performance to disconnect the movable clutch member, a trip means to hold the latter against further movement, means operable automatically at the conclusion of a sound reproducing performance to release said movable member, and means operable by the latter to elevate and return the tone-arm to initial position.

11. The combination in a sound reproducing machine including the tone-arm and record turning mechanism, of a rotary element adapted to be connected to the record turning mechanism and mounted for lateral clutching movement, a concentric ridge forming part of said element and having a depression, a pin normally resting against the ridge to retain said element in clutched position, whereby said element may be partially rotated at the beginning of a sound reproducing performance to permit entry of the pin into the recess and consequent declutching of said element, a tripping means to retain said element declutched and against further rotation, means operable automatically at the conclusion of the sound reproducing performance to trip said retaining means to clutch and permit rotation of said element, and means operable by the latter to elevate and return the tone-arm to initial position.

12. The combination in a sound reproducing machine including the tone-arm and record turning mechanism, of a rotating member having a convoluted groove and a clutch face, a follower operating in the groove, a carrier movable axially of the member and supporting the follower, means connecting the carrier to the tone-arm for coincident travel, a complementary clutch member, a plate disposed above the carrier and adapted to be tripped by the latter in any of its shifted positions, means carried by the plate to retain the complementary clutch member against rotation during rotation of the threaded member, said follower being operable when at rest to elevate the carrier and trip the plate to thereby release the complementary clutch member for clutching engagement with the rotating threaded member, and means operable by said complementary clutch member to elevate and return the tone-arm and carrier to initial positions.

13. In a sound reproducing machine the combination with means for elevating and returning the tone-arm, of an adjustable abutment to limit degree of return movement of the tone-arm to re-play a selected portion of the record, and means operable at the conclusion of the performance to withdraw the abutment and permit return of the tone-arm to rest position.

14. In a sound reproducing machine including means to elevate and return the tone-arm, the combination of an adjustable abutment to limit the degree of return movement of the tone-arm, means coordinated with said tone-arm returning means to permit a predetermined number of repetitions of the sound reproducing performance, and means operable at the conclusion of the last repetition to withdraw said abutment and permit return of the tone arm to initial position.

15. In a sound reproducing machine including means to elevate and return the tone-arm, the combination of an adjustable abutment, means carried by the tone-arm engageable by the abutment to limit movement of the latter, and a setting mechanism for shifting the abutment and operable upon engagement of said abutment with said tone-arm carrying means to permit successive repetitions of the sound reproducing performance and upon the conclusion of the last repetition to withdraw said abutment to permit return of the tone-arm to initial position.

16. In a sound reproducing machine including means to elevate and return the tone-arm to initial position, the combination of a stop member movable with the tone-arm, an adjustable abutment to engage the stop and limit degree of subsequent return movement of the tone-arm, an adjusting means operable to position the abutment in the manner stated, and an escapement mechanism adapted to be set after the abutment has been shifted in the manner stated for a predetermined number of releasing movements, means operable at the conclusion of each repetition to release said escapement mechanism and operable at the conclusion of the last repetition to withdraw said abutment and permit return of the tone-arm to initial position.

17. In a sound reproducing machine, the combination of a stop member carried by the tone-arm, an adjustable abutment to engage the stop member and by its assumed position to limit degree of subsequent return movement of the tone-arm, a setting mechanism including a manually movable arm having connection to said abutment, an escapement mechanism including toothed disks and a cooperating movable detent, a pawl carried by the arm and cooperating with a rounded projection carried by one disk whereby said disks may be manually rotated to move the arm and shift the abutment in the manner stated and upon the engagement of said abutment with the stop member to cause the rounded projection to disengage the pawl and permit further rotation of said disks without moving the arm, and means coordinating the detent with the tone-arm returning means to permit return movement of the tone-arm at the conclusion of the last repetition.

18. In a sound reproducing machine including the tone-arm, the combination of a rod, a slide having an opening in one end to receive the rod and depending therefrom, said slide upon engagement at its lower end with the tone-arm having capacity to bind against the rod and function as a stop to limit movement of the tone-arm, and means co-ordinated with the tone-arm for engaging the slide at a point adjacent the rod to shift the same for the purpose of adjustment initially in determining the starting position of the stylus in repeating.

19. In a sound reproducing machine the combination of the tone-arm, a rotary cam member, means operable by said cam to elevate and return the tone-arm to initial position at the conclusion of each sound reproducing performance, a replaying means limiting degree of return movement of the tone-arm and including an escapement mechanism having a movable detent adapted to limit the number of repetitions of the performance, and a member engageable by the cam to operate the detent and release the escapement mechanism at the conclusion of each repetition.

20. The combination in a sound reproducing machine including the tone-arm, of a rotary member to elevate and return the tone-arm to initial position, a tripping means restraining said member against rotation, and a manually operable means including a press button and connections to release said tripping mechanism and permit return movement of the tone-arm in the manner set forth.

21. The combination in a sound reproducing machine including the tone-arm, of means to elevate and return the tone-arm to initial position, a trip means restraining said operating means against movement, an adjustable abutment to limit degree of return movement of the tone-arm, means to shift said abutment comprising a sleeve, an escapement mechanism including toothed disks carried by the sleeve, means operable by rotation of the disks to shift the abutment, a detent mechanism cooperating with the disks, means actuating the detent mechanism to release the disks at the conclusion of each sound reproducing performance, a rod slidable in said sleeve adapted to be manually depressed, and means operable upon depression of the rod to release said tripping means and permit return of the tone-arm to initial position at any time prior to the conclusion of a sound reproducing performance.

In testimony whereof, I have hereunto signed my name at Philadelphia, Pennsylvania, this 23rd day of October, 1922.

ROBERT M. MILLER.